United States Patent [19]

Diaz

[11] 4,091,898
[45] May 30, 1978

[54] VEHICULAR AUXILIARY BRAKING SYSTEM

[76] Inventor: Jose A. Diaz, 3901 Kennedy Blvd., Union City, N.J. 07087

[21] Appl. No.: 761,951

[22] Filed: Jan. 24, 1977

[51] Int. Cl.² .......................................... B60K 29/02
[52] U.S. Cl. ................................. 192/3 M; 74/484 R
[58] Field of Search ................ 192/3 M, 3 R, 3 S; 74/484 R, 481, 486, 488

[56] References Cited

U.S. PATENT DOCUMENTS

| 1,343,750 | 6/1920 | Scott | 192/3 M |
| 2,539,994 | 1/1951 | Engler | 192/3 R X |
| 2,570,988 | 10/1951 | Rychwalski | 74/481 |
| 2,658,409 | 11/1953 | Hughes | 74/484 |
| 2,875,638 | 3/1959 | Sell | 192/3 S X |
| 2,949,044 | 8/1960 | Hughes | 74/481 |

Primary Examiner—Benjamin W. Wyche
Attorney, Agent, or Firm—J. Gibson Semmes

[57] ABSTRACT

Manual and/or accelerator pedal auxiliary controls for conventional vehicular braking systems. The manual control is adapted to the steering column of the vehicle and is mounted for auxiliary actuation, relative to the conventional brake pedal system of the vehicle. The accelerator pedal control which may be used in supplement or in auxiliary relation to both manual and conventional brake pedal control, is adapted to simultaneously prevent inadvertent acceleration during the braking function.

2 Claims, 5 Drawing Figures

VEHICULAR AUXILIARY BRAKING SYSTEM

REFERENCE TO PRIOR ART

The known prior art comprises the following U.S. Pat. Nos.: 1,906,366, Burns, 2,223,800, Fines, 2,470,273, Von Uffel, 2,507,484, Stone, 2,539,994, Engler, 2,777,335, Enberg et al., 3,364,818, Hager et al.

The basic distinction between applicant's invention and the art resides in the simplicity of construction and uniquely adapted torque force transmission in conjunction with the conventional brake pedal system of a vehicle, said transmission being universally adapted to both manual or accelerator foot pedal control.

DESCRIPTION OF THE PREFERRED EMBODIMENTS

From the ensuing description, it will be appreciated that the invention in its various forms is applied to the extant braking system of a conventional vehicle such as automobile, truck, van or other wheeled vehicle. The invention may be used simultaneously with the conventional braking without altering the effectiveness of the applied braking action, to bring the vehicle to a halt. In effect, an operator on impulse may activate a hand brake lever which is adapted to the steering wheel of the vehicle by applying the middle or any other finger thereto to activate by cable connection an auxiliary braking system. This in turn will activate the piston within a conventional master cylinder, forcing the fluid into the wheel cylinders for the purpose of activating the brake shoes in the braking mode. In a conventional vehicle, one may thus apply 80 lbs. psi hydraulic pressure and in electric systems five to six times the amount of power required. The principle of invention is to take advantage of the natural reflex action of the operator who, upon perceiving the necessity for halting the vehicle, may be inclined to squeeze with the fingers and/or in the alternate respond to an impulse to push the accelerator pedal of the device as when frightened or surprised.

Figure 1:
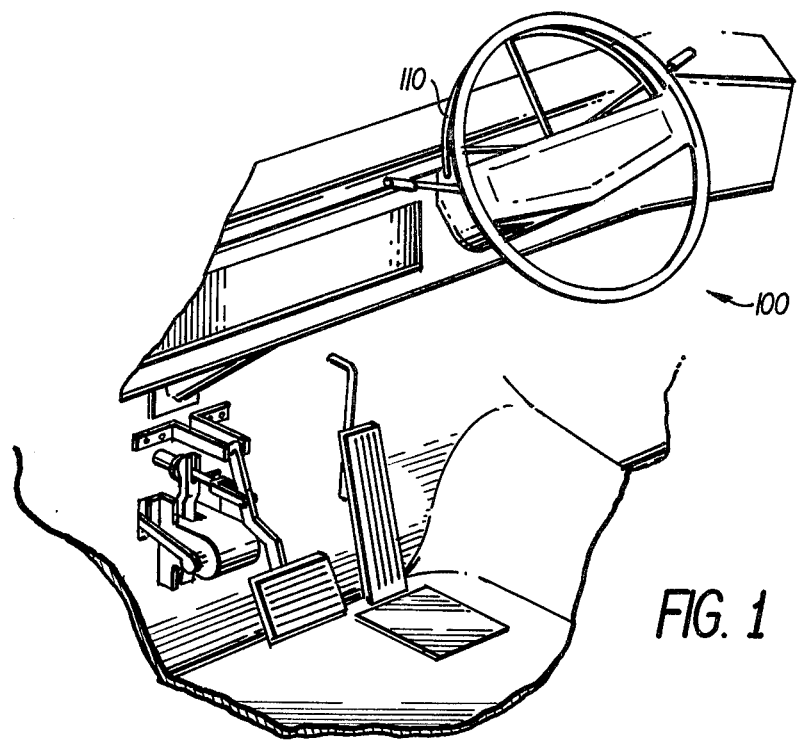
FIG. 1 is a view in perspective of the manual auxiliary brake control as applied to an automobile.
Figures 4, 5:
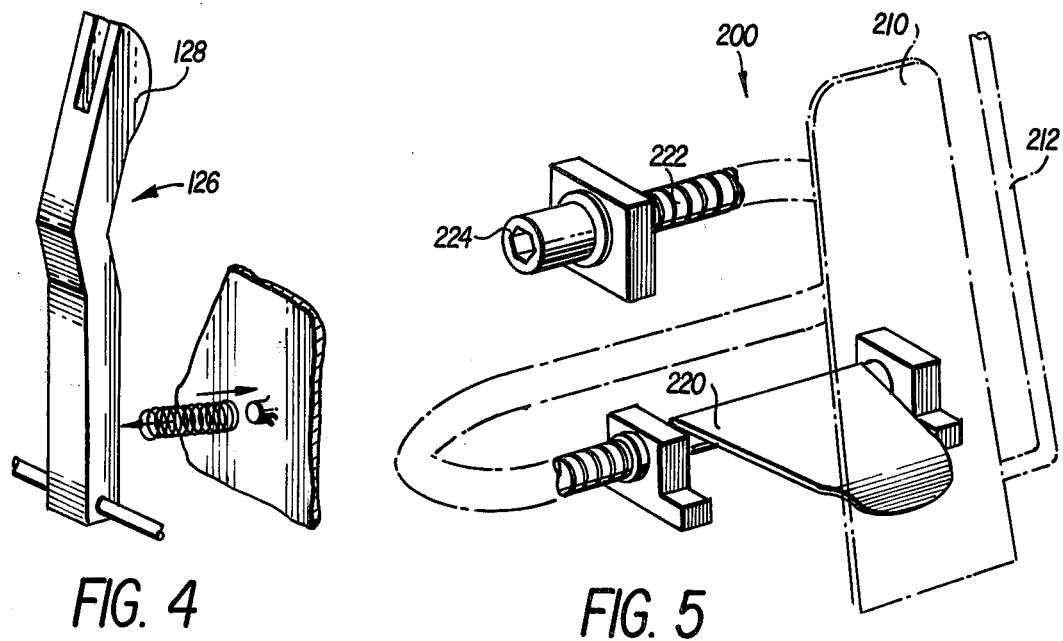
FIG. 4 is an enlarged view of the braking lever which is connected to the transmission of FIG. 3.
FIG. 5 is an enlarged perspective view of an alternate accelerator pedal braking control system.

Referring to FIG. 1, the manual braking control is illustrated in its application to a conventional automobile, there being shown a half circular manual braking lever 110, adapted to the forward side of the conventional steering wheel at the steering column. This hand brake is designed for reciprocable motion, the same being spring-biased downwardly and forwardly and having direct connection with the hand brake cable 112, said cable being appropriately engaged at 114 at the forward end with yoke 116, said yoke having connection with the one or two power transmission braking levers 118. The size and disposition of the respective puller yoke 116 and levers 118 gives to the cable 112 a very substantial mechanical advantage and effect, considering the shortness of the stroke applied to the cable through the hand brake lever 110. The yoke is adapted as a puller for interconnection with the ends of corresponding lever actuators 118, these actuators being disposed on either side of the transmission housing 120 and having interconnection via hexagonal bolts to two driving gears 122, journaled within the walls of the housing for clockwise rotation. These driving gears 122 when rotated by means of the hand actuation, now apply a counter-rotating torque force to these two other driven gears 122', said gears 122' bearing the cam connector 124. The cam is adapted to impart forward rotational movement to the lever 126. The lever is fulcrum mounted upon a rod in the bracket which retains the housing 120 on the firewall of the vehicle. The lever 126 has at its forward end the yoke 128 which when moved forward in braking by hand engages an adapted bushing in the pushrod of the master cylinder of the conventional system. The pushrod is in turn conventionally connected to the footbrake pedal 130. See FIGS. 1 and 2. When not functioning in braking, the lever 126 is by spring mounting, retracted from contact with the master cylinder pushrod. See FIGS. 2 and 4.

Figure 2:
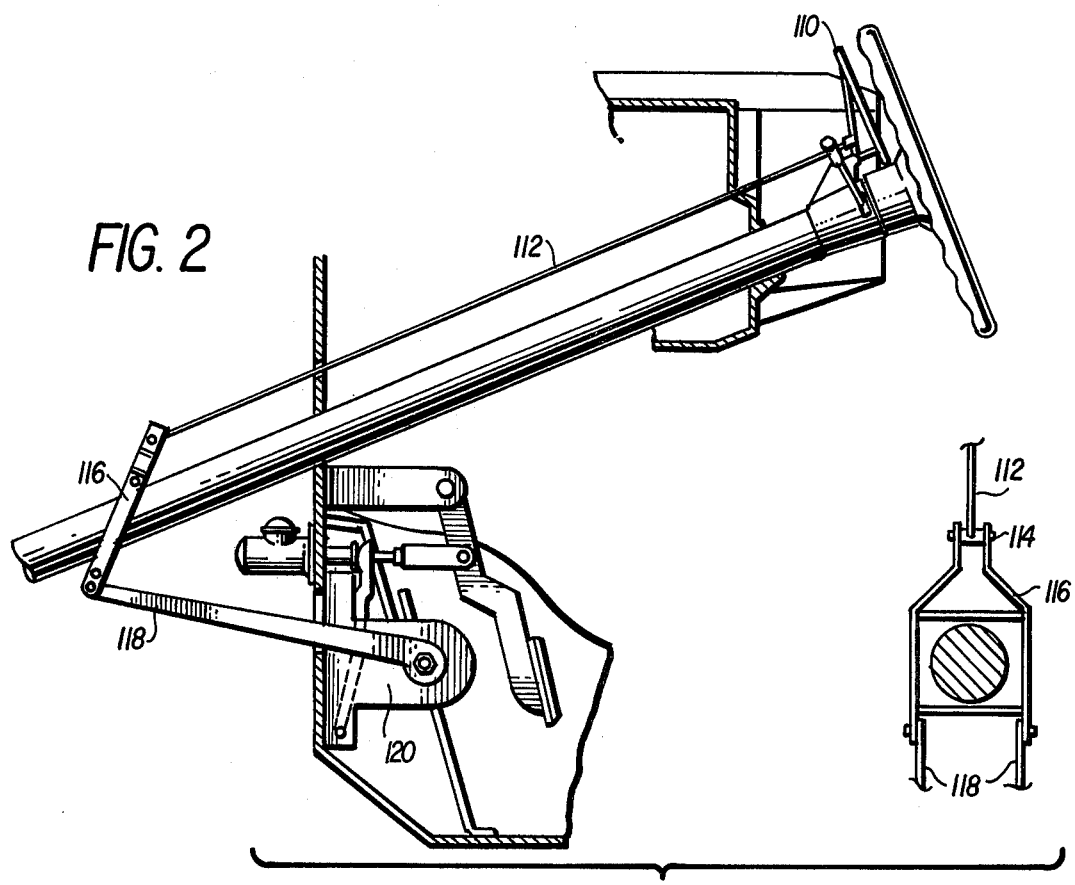
FIG. 2 is a view in side elevation of the system of FIG. 1.
Figure 3:
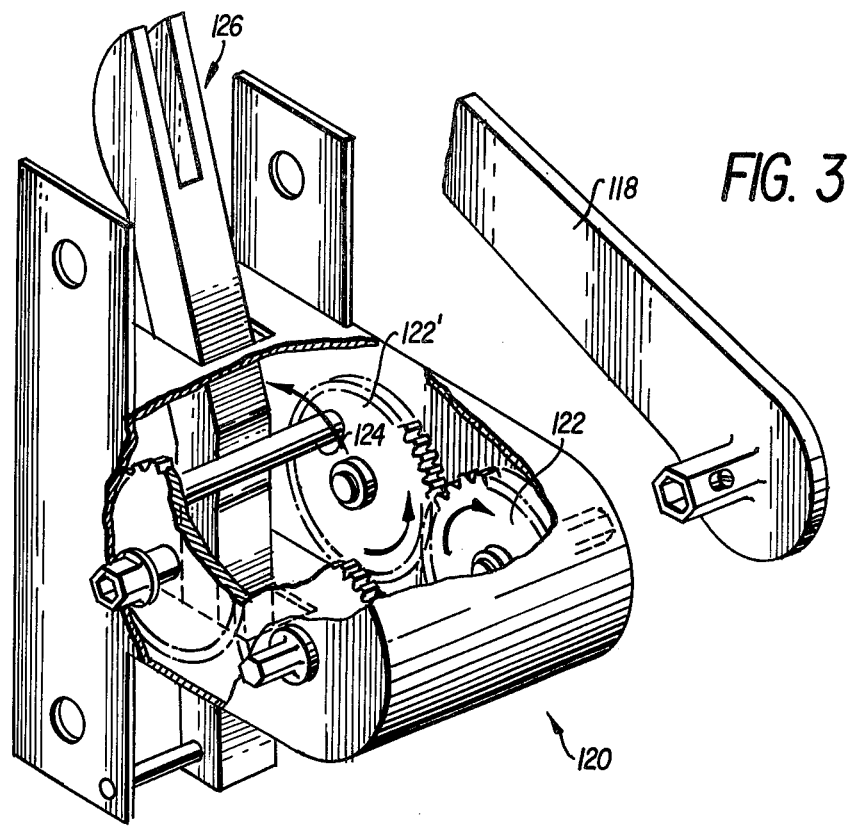
FIG. 3 is an enlarged view in perspective of the novel torque power transmission.

In operation of the embodiment illustrated in FIGS. 1 and 2, the operator applies a very small force, against a compression spring load, with one of the fingers, to the hand brake 110, causing the cable 112 to exert a rearward and/or lifting motion to the cable, raising the yoke arm 116 to impart a corresponding rotational movement to the levers 118 which when applied through a hexagonal shaft, imparts clockwise rotation to the toothed driving gears 122 and a counter-rotating force to the toothed driven gears 122', whereby through cam 124, acting upon lever 126, suitable forward motion is imparted to the push lever 126 for the braking mode. The hand brake half ring 110 and actuating lever 126 are each appropriately spring-biased against movement so that upon deactivation, they return all working elements to normal position of readiness.

A coactive deceleration effect of hand braking may be applied simultaneously with the hand braking through the driven gear 122' by means of hexagonal nut interconnection of a flexible shaft 222 through the hexagonal bolt end 224 thereof. This will raise by rotation in a counter-clockwise direction of the flexible cable, the accelerator stop 220. The accelerator stop 220 is swivel mounted whereby due to its interconnection with the braking transmission system 120 it is caused to rise in an upward motion to engage and hold the accelerator pedal 210 in preventive acceleration, eliminating thereby all possibility of erroneous acceleration. Although not specifically shown, this accelerator stop 220 is returned by tension from the lever 126, causing it to descend to a normal downward rest position, outside the path of the accelerator.

From the foregoing, it will be appreciated that the combination is adapted not only to facilitate braking by the manual control but also to preclude the possibility of inadvertent acceleration during an intended braking mode.

I claim:

1. Vehicular auxiliary braking device adapted to conventional hydraulic foot braking system of a wheeled vehicle wherein said vehicle has a steering column and steering gear, associated hydraulic braking system, including master cylinder comprising:

A. a first hand lever mounted upon the steering column and in direct alignment with the steering wheel of the vehicle for reciprocable motion relative to the steering wheel;
B. a second lever, interconnected to the first lever and a pinion mounted upon a transmission whereby upon movement of the first lever, the second lever is rotated;
C. a torque transmission coactively connected to the pinion, said torque transmission having an eccentric means mounted thereon;
D. a third lever coactively positioned, relative to the eccentric of the torque transmission, said third lever being spring urged and adapted to engage and disengage a pushrod of the master cylinder, whereby gripping the first hand lever, braking force may be applied to the pushrod of the master cylinder.

2. The vehicular auxiliary braking system of claim 1, further including an accelerator stop swivel mounted for emergency contact with the accelerator, said accelerator stop having interconnection with the transmission whereby upon application of the hand lever, rotation from the transmission will cause the accelerator stop to rotate into a position of abutment, relative to the accelerator.

* * * * *